US010073003B2

(12) United States Patent
Nakajima et al.

(10) Patent No.: US 10,073,003 B2
(45) Date of Patent: Sep. 11, 2018

(54) SEEDING DEVICE AND SEEDING METHOD

(71) Applicant: HONDA MOTOR CO., LTD., Tokyo (JP)

(72) Inventors: Masato Nakajima, Saitama (JP); Yuichi Fukuchi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 10 days.

(21) Appl. No.: 14/560,143

(22) Filed: Dec. 4, 2014

(65) Prior Publication Data

US 2015/0174596 A1 Jun. 25, 2015

(30) Foreign Application Priority Data

Dec. 25, 2013 (JP) ................................ 2013-268012

(51) Int. Cl.

| | |
|---|---|
| ***B05B 1/00*** | (2006.01) |
| ***G01M 9/06*** | (2006.01) |
| ***B05B 1/26*** | (2006.01) |
| *B05B 7/00* | (2006.01) |

(52) U.S. Cl.
CPC ............... *G01M 9/067* (2013.01); *B05B 1/26* (2013.01); *B05B 7/0012* (2013.01)

(58) Field of Classification Search
CPC ......... G01M 9/067; B05B 1/26; B05B 7/0012
USPC ....... 239/338, 398, 122, 499, 120, 103, 543, 239/433, 370; 73/861, 5; 261/116, 78.2
See application file for complete search history.

(56) References Cited

U.S. PATENT DOCUMENTS 3,236,458 A * 2/1966 Ramis .................... A61M 11/00 128/200.18
3,251,556 A * 5/1966 Burnham ................ B05B 1/267 239/103
4,591,099 A * 5/1986 Emory .................... B05B 1/042 239/419
RE33,717 E * 10/1991 Svoboda ................ A61M 11/06 128/200.18
5,153,665 A * 10/1992 Weinstein ............... G01F 1/708 356/28
5,979,245 A * 11/1999 Hirano ...................... G01P 5/26 73/861.05

(Continued)

FOREIGN PATENT DOCUMENTS

JP 2006-055714 A 3/2006
JP 2012-112756 A 6/2012

(Continued)

OTHER PUBLICATIONS

University of Maryland, “Flow Through a Cylinder”, www.atmos.umd.edu/~russ/634pipes.doc.*
JP OA, Application No. 2013-268012, Dated Nov. 24, 2015.

*Primary Examiner* — Steven J Ganey
*Assistant Examiner* — Viet Le
(74) *Attorney, Agent, or Firm* — Squire Patton Boggs (US) LLP

(57) ABSTRACT

A seeding device 1 includes a seeder 3 that jets out a jet flow 2 containing oil particles and gas therein, and a tubular body 5, 23 surrounding the jet flow 2. The distance X from a starting end S of the jet flow 2 to the tip end T of the tubular body 5, 23 is set so that the progressing rate of atomization of the oil particles at the tip end T of the tubular body 5, 23 is a predetermined rate or less.

7 Claims, 5 Drawing Sheets

(56) References Cited

U.S. PATENT DOCUMENTS

| | | | | |
|---|---|---|---|---|
| 6,364,219 | B1 * | 4/2002 | Zimmerman | B05B 1/1654 222/79 |
| 6,405,944 | B1 * | 6/2002 | Benalikhoudja | A61L 9/145 128/200.18 |
| 8,322,633 | B2 * | 12/2012 | Hubert | A62C 5/02 239/343 |
| 8,894,044 | B2 * | 11/2014 | Furner | A01M 1/2077 239/338 |
| 2006/0283985 | A1 * | 12/2006 | Ikeuchi | B05B 1/26 239/543 |
| 2011/0049266 | A1 * | 3/2011 | Jorgensen | A61L 9/03 239/338 |
| 2011/0284648 | A1 * | 11/2011 | Gharib | A61M 11/00 239/1 |

FOREIGN PATENT DOCUMENTS

| | | | | |
|---|---|---|---|---|
| JP | 2012-112757 | A | 6/2012 | |
| WO | WO 2005005055 | A1 * | 1/2005 | B05B 1/3006 |

* cited by examiner

SEEDING DEVICE AND SEEDING METHOD

BACKGROUND OF THE INVENTION

1. Field of the Invention

The present invention relates to a seeding device including a seeder from which a jet flow including liquid particles and gas is jetted, the seeding device supplying tracer particles made up of such liquid particles into a wind tunnel, and such a seeding method.

2. Description of the Related Art

Conventionally known seeding devices of such a type include a device provided with a seeder from which a jet flow containing oil particles and air is jetted, and a collision surface intersecting the jetting direction of the jet flow (see Patent Literature 1, for example).

Such a seeding device is configured so that oil particles of a large particle size collide with the collision surface without being carried with the air deflecting due to the collision surface, and are captured by the collision surface. On the other hand, oil particles of a small particle size are carried with the air deflecting due to the collision surface, and are supplied as tracer particles into a wind tunnel without colliding with the collision surface. This can prevent the walls and the floor in the wind tunnel from being fouled with tracer particles of a large particle size.

CITATION LIST

Patent Literature 1: Japanese Patent Application Laid-Open No. 2012-112756

SUMMARY OF THE INVENTION

Such a seeding device provided with a collision surface can prevent tracer particles of a large particle size from being discharged into a wind tunnel. However, the amount of tracer particles of a small particle size to be supplied into the wind tunnel unfortunately decreases.

That is, tracer particles in this case are supplied into a wind tunnel after removing oil particles of a large particle size by letting the jet flow jetted from the seeder collide with the collision surface, meaning that particles that would grow as micro-particles due to atomization action of the jet flow are removed during the growth. The resultant tracer particles have a decreased amount of particles of a small particle size that are suitable for tracing as compared with the amount of tracer particles when they are directly supplied into a wind tunnel not via the collision surface.

In view of such a problem of the conventional techniques, the present invention aims to provide a seeding device capable of supplying more tracer particles of a small particle size suitable for tracing, while removing particles of a large particle size, and such a seeding method.

As a result of diligent studies, the present inventors found that the collision surface of the conventional seeding device as stated above hinders atomization of liquid particles in the vicinity of the center axis in the jet flow from the seeder, thus achieving the present invention.

That is, a seeding device of the present invention includes a seeder, from which a jet flow containing liquid particles and gas is jetted out, the seeding device being configured to discharge tracer particles made up of the liquid particles. The seeding device includes a tubular body that surrounds the jet flow in a jetting direction of the jet flow so as to allow a part of the liquid particles in the jet flow to adhere to an inner wall of the tubular body. The tubular body is configured to discharge liquid particles in the jet flow that have progressed in atomization inside of the tubular body from a tip end thereof as tracer particles, and a distance from a starting end of the jet flow to the tip end of the tubular body in the jetting direction of the jet flow is set so that a progressing degree of the atomization at the tip end of the tubular body is a predetermined value or less.

In the configuration of the present invention, as liquid particles in the jet flow jetted out from the seeder are located closer to the center of the jet flow, the rate of atomization of such liquid particles progresses more to a position away from the starting end of the jet flow. Then, liquid particles of a relatively large particle size that are away from the center of the jet flow, where such atomization does not progress much, adhere to the tubular body and are collected without being discharged. This can limit the particle size of tracer particles discharged to be a predetermined value or less as much as possible.

At this time, the jet flow jetted out from the seeder is surrounded by the tubular body only at the circumference along the jetting direction. That is, atomization at a part closer to the center of the jet flow is not disturbed, and the particles there can be discharged.

That is, unlike the conventional techniques, in which liquid particles that flow at a region closer to the center of the jet flow would collide with an inclined surface intersecting the center of the jet flow for collection, atomization there can progress sufficiently. This can supply more tracer particles of a particle size suitable for tracer than the conventional techniques.

Note here that such progressing of atomization substantially stops when the jet flow travels to a position away from the starting end to some extent, and the atomization no longer progresses substantially. That is, the progressing rate of the atomization is high at a region of a small distance from the seeder in the tubular body, but decreases with an increase in the distance and becomes zero when the distance approaches a certain value.

Then the present invention is configured to consider a change characteristic of the progressing rate of atomization with reference to a change in the distance from the seeder and to set the distance from the starting end of the jet flow to the tip end of the tubular body so that the progressing rate of atomization at the tip end of the tubular body is a predetermined value or less. For instance, the distance to the tip end of the tubular body can be set so that the progressing rate of the atomization at the tip end becomes about zero. This can promote the atomization in the tubular body sufficiently.

The tubular body preferably has a size as small as possible so as not to disturb the air flow in the wind tunnel, considering the supplying of tracer particles into the wind tunnel. Then, it is not preferable that the distance from the seeder to the tip end of the tubular body has an unnecessary large value beyond the distance of making the progressing rate of the atomization zero.

Meanwhile, the progressing rate of atomization approaches zero gradually when the distance from the seeder approaches a certain value. This means that the distance to the tip end of the tubular body can be shorter than the distance of making the progressing rate of the atomization zero to some extent, from which the effect of promoting atomization can be obtained.

In the present invention, a value that is obtained by dividing the distance from the starting end of the jet flow from to the tip end of the tubular body by a diameter of the jet flow at the starting end may be 50 or more.

In general, the degree of progressing of atomization in a jet flow, as to what degree of distance x from the starting end of the jet flow in the jetting direction, is substantially proportional to the diameter d of the jet flow at the starting end. Then, the change characteristic of the average particle size in the jet flow with reference to the change in the value of x/d that is a normalized value of the distance x divided by the diameter d is examined, and the resultant shows that the change in the average particle size becomes constant when x/d is at about 50. The state where the change in the average particle size becomes constant means that the progressing rate of the atomization as stated above becomes zero, and so the atomization stops.

That is, the distance X from the starting end of the jet flow to the tip end of the tubular body is set so that the value X/D that is a value divided by the diameter D at the starting end of the jet flow is 50 or more as in the present invention, whereby atomization can be promoted sufficiently in the tubular body. The above-stated change characteristic of the average particle size represents the change characteristic of the progressing rate of atomization with reference to the change in the distance from the seeder as stated above as well.

In the present invention, the tubular body may have a dimension in a direction orthogonal to a center axis of the jet flow that is determined based on a change characteristic of shear stress with reference to a change in position in the direction in the jet flow.

The inner radius of the tubular body can be set as follows, for example. That is, at the tip end position of the tubular body with the X/D=50, shear stress at the radial direction position r from the center in the jet flow is considered when there is no tubular body provided. Then, if the radial direction position r becomes R when this shear stress is half of the shear stress at the center, this R or a value larger than this can be set as the inner radius of the tubular body.

When the jet flow is not surrounded with the tubular body, the jet flow will be disturbed due to the influences from the surrounding, and so it is difficult to specify the center axis of the jet flow. On the other hand, when the jet flow is surrounded with the tubular body along the jetting direction, the center axis of the jet flow can be recognized assuming that the direction of the jet flow substantially agrees with the jetting direction, and so the center axis substantially agrees with the center axis of the tubular body.

Further, the distribution of shear stress in the jet flow in the tubular body has a correlation with the distribution of shear stress in the jet flow when there is no tubular body provided. That is why the inner radius of the tubular body can be set by referring to the distribution of shear stress in the jet flow when it is not surrounded with the tubular body as stated above.

In this way, considering the change characteristic of shear stress with reference to the change in position in the direction orthogonal to the center axis in the jet flow, the dimensions in such a direction of the tubular body can be set, whereby atomization can be promoted sufficiently while making use of the shear stress that contributes to the atomization of liquid particles in the jet flow.

In the present invention, an opening may be provided at a position at the tubular body in a predetermined range from the seeder, the opening being configured to introduce outside air into the tubular body.

With this configuration, a ring vortex is generated in the vicinity of the starting end of the jet flow from the seeder, and division and disappearance of such a ring vortex can be promoted without problems by the outside air introduced through the opening. This can promote the growth of the jet flow, i.e., the atomization, and so liquid particles of a large particle size that adhere to the inner wall of the tubular body can decrease in number, and accordingly liquid particles of a small particle size that are suitable for tracer increase in number. In this way, more tracer particles can be discharged.

In the present invention, the opening may be located in a longitudinal direction of the tubular body at a position of the starting end of the jet flow or at a position from the position closer to the tip end of the tubular body. This enables outside air to be introduced from the opening at the starting end of the jet flow or at a position closer to the tip end of the tubular body, and so the division and disappearance of a ring vortex in the jet flow can be promoted reliably.

A seeding method of the present invention comprises, disposing the seeding device according to the present invention in a wind tunnel, and then jetting out a jet flow containing liquid particles and gas from the seeder of the seeding device, thus supplying tracer particles into the wind tunnel. This can supply tracer particles into the wind tunnel while exerting the aforementioned effects from the seeding device.

DESCRIPTION OF THE PREFERRED EMBODIMENTS

Figure 1:
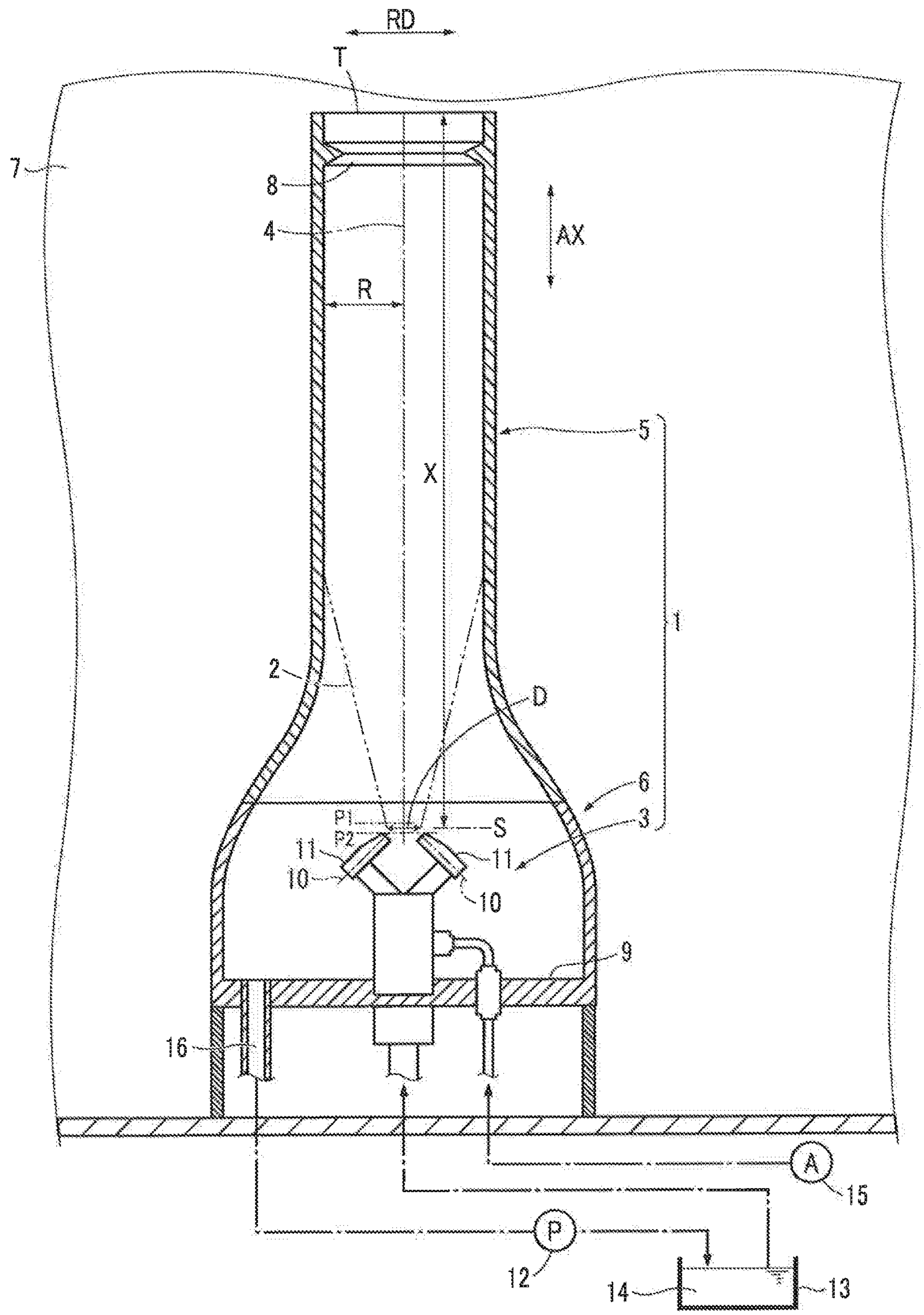
FIG. 1 is a cross-sectional view of a seeding device according to one embodiment of the present invention.

The following describes embodiments of the present invention, with reference to the drawings. As illustrated in FIG. 1, a seeding device 1 of the present embodiment includes a seeder 3 that jets out a jet flow 2 containing oil particles and air therein, and is configured to discharge tracer particles made up of the oil particles.

The seeding device 1 includes a tubular body 5 that surrounds the jet flow 2 from the seeder 3 along a center axis 4 in the jetting direction of the jet flow 2 so that some of the oil particles in the jet flow 2 adhere to the inner wall thereof, and an oil receiver 6 that receives an oil flow that is the collection of the oil particles adhered to the tubular body 5.

In FIG. 1, the direction AX represents the direction of the jet flow 2 and the center axis 4 of the tubular body 5, and the direction RD represents the radial direction of the jet flow 2 and the tubular body 5.

The tubular body 5 is configured to adjust so that the oil particles contained in the jet flow 2 from the seeder 3 have the average of the particle size that is a predetermined value or less without disturbing its atomization, and to supply the oil particles into a wind tunnel 7 as tracer particles. Such adjustment is performed by removing oil particles of a large particle size from the jet flow 2 because they adhere to the inner wall of the tubular body 5.

An annular protrusion 8 is provided on the inner wall close to the exit of the tubular body 5 so as to protrude inwardly and annually. The annular protrusion 8 has a function to prevent oil particles adhered to the inner wall of the tubular body 5 from flowing out into the wind tunnel 7.

The seeder 3 includes a nozzle base 9 that is defined with a bottom part of the oil receiver 6, and two nozzles 11 having their center axes 10 crossing each other above the nozzle base 9. Each nozzle 11 receives oil 14 supplied by an oil pump 12 from a tank 13, and receives compressed air supplied from an air compressor 15. The tank 13 contains the oil 14 as a raw material of the tracer particles, such as DOS (lubrication oils) or the mixture of water and glycerin.

A collection channel 16 is disposed from the nozzle base 9 to the tank 13, having one end that is open to the bottom part of the nozzle base 9 and the other end that is open in the tank 13. Oil of the oil particles adhered to the inner wall of the tubular body 5 is collected to the tank 13 via the collection channel 16.

The two nozzles 11 configure a two-fluid nozzle of a collision type that allows atomized particles sprayed from these nozzles 11 to collide with each other for re-atomization. That is, each nozzle 11 sprays the oil 14 supplied from the tank 13 while atomizing it with compressed air from the air compressor 15. Since the center axes 10 of the two nozzles 11 cross each other at predetermine angles, oil particles sprayed from the nozzles 11 collide mutually, and so are jetted out in the form of oil particles of a smaller particle size.

In this way, the seeder 3 jets out the jet flow containing oil particles and air while setting a starting end S at some part in the vicinity of the collision of oil particles from the nozzles 11. This jet flow contains oil particles of various diameters ranging from 1 to 10 [μm], for example. Among them, the oil particles that are suitable for tracer particles are those having the diameter of 1 to 4 [μm], for example.

Figure 2:
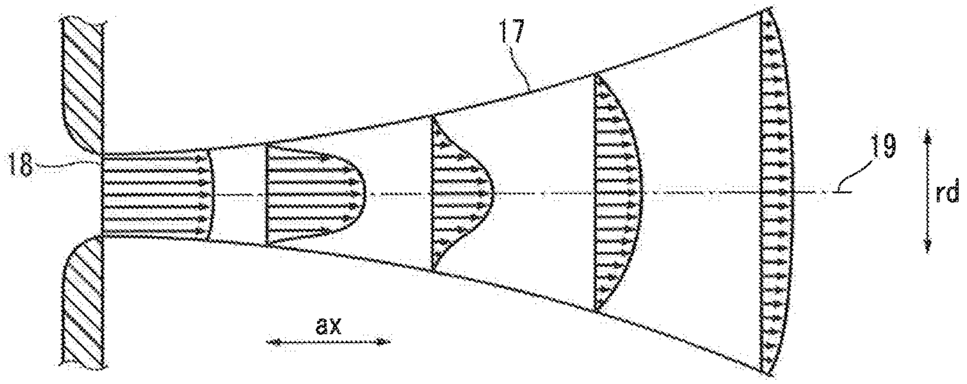
FIG. 2 illustrates speed distribution, representing the structure of a jet flow that is jetted out into a static fluid.

FIG. 2 illustrates speed distribution, representing the structure of a jet flow 17 that is jetted out into a static fluid. Arrows in FIG. 2 (arrows other than those denoted as ax and rd representing the directions) represent vectors indicating the magnitude and the direction of velocity of the jet flow 17 at the corresponding positions. The direction ax denotes the direction of the center axis 19 of the jet flow 17 and the direction rd denotes the radial direction of the jet flow 17.

As illustrated in FIG. 2, the jet flow 17 that is jetted out into a static fluid has a substantially uniform speed distribution in the radial direction rd at the starting end 18. Such a region with a uniform speed distribution (potential core) then decreases in a tapered form like a cone as the jet flow is mixed with the surrounding fluid and then disappears.

After that, the speed of the jet flow 17 on the center axis 19 of the jet flow 17 also decreases. During this process, the jet flow 17 assumes a mountain-shaped speed distribution such that the speed is the largest on the center axis 19. Then, as the jet flow travels downstream, it expands in the radial direction rd to be flat.

Figure 3:
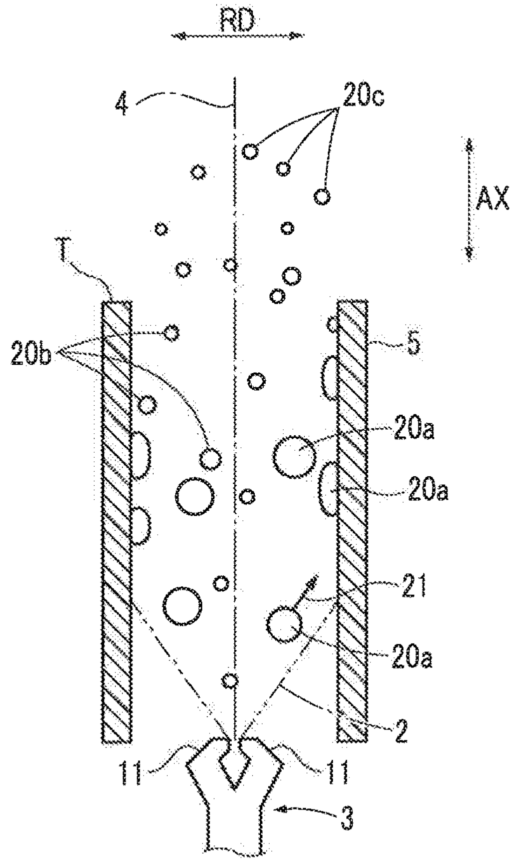
FIG. 3 schematically illustrates the state of oil particles in a jet flow in the seeding device of FIG. 1.

The jet flow 17 has a property such that it expands in this way and the speed distribution thereof becomes uniform. The jet flow 2 from the seeder 3 according to the present embodiment, however, is surrounded with the tubular body 5 on the outer side in the radial direction rd. As a result, as illustrated in FIG. 3 schematically, oil particles 20*a* of a relatively large particle size on the outer side of the radial direction RD in the jet flow 2 collide with the inner wall of the tubular body 5 due to a relatively large inertia force 21 acting thereon and adhere to the inner wall.

On the other hand, oil particles 20*b* of a relatively small particle size are carried with the jet flow 2 because the ratio of its fluid force to the inertia force is larger than that of the large oil particles 20*a*, and so hardly adhere to the inner wall of the tubular body 5. This is because the fluid force is proportional to the square of the particle size, while the inertia force is proportional to the cube of the particle size. This means that the value of the average particle size in the jet flow 2 decreases as the jet flow travels through the tubular body 5. Then, the oil particles 20*b* of a small particle size are discharged from the tubular body 5 as tracer particles 20*c*.

As illustrated in the above FIG. 2, the jet flow 17 that is jetted out into a static fluid has a speed distribution in a mountain shape where the speed is the largest on the center axis 19. This applies to the jet flow 2 jetted out from the seeder 3 and passing through the tubular body 5 as well as the case of a laminar flow or a turbulent flow flowing through a tube.

Therefore, in the jet flow 2 jetted out from the seeder 3, the atomization progresses favorably in the vicinity of the center axis 4 having a large flow speed. Shear stress relating to promotion of atomization is associated with the Reynolds stress and the viscosity stress, where the Reynolds stress is dominant. This is because the Reynolds stress increases with the flow speed.

However, the atomization of oil particles stops at a position that is away from the starting end S (see FIG. 1) of the jet flow 2 to some extent. That is, the tubular body 5 preferably extends at least to the position where the atomization of oil particles stops, or in the vicinity of the position. To this end, the distance X from the starting end S of the jet flow 2 to the tip end T of the tubular body 5 is set so that the rate of progressing of the atomization at the tip end part of the tubular body is a predetermined rate or less.

Meanwhile, the tubular body 5 preferably has a size as small as possible so as not to disturb the air flow in the wind tunnel 7. Considering these points, the distance X at the seeder 3 from the starting end S of the jet flow 2 to the tip end T of the tubular body 5 is determined as follows.

Figure 4:
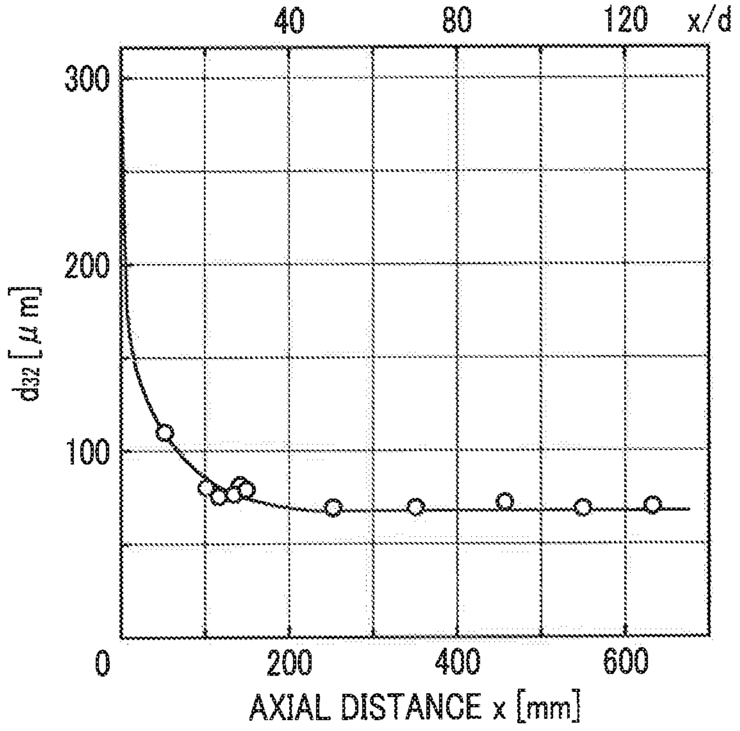
FIG. 4 is a graph illustrating the change characteristic of the Sauter mean particle size with reference to the distance from the nozzle on the center axis in the jet flow jetted from a two-fluid nozzle, where the horizontal axis on the lower side represents the distance from the nozzle in the axial direction x [mm], the horizontal axis on the upper side represents x/d that is a normalized value of the axial distance x from the nozzle divided by the diameter d at the starting end of the jet flow, and the vertical axis represents the Sauter mean particle size (d32) [μm].

FIG. 4 illustrates the transition of the Sauter mean particle size with reference to the distance from the nozzles (starting end of jet flow) on the center axis in the jet flow from a two-fluid nozzle. The horizontal axis on the lower side of the graph represents the distance from the nozzle on the center axis in the jet flow (axial direction distance) x [mm], and the vertical axis represents the Sauter mean particle size (d32) [μm]. The horizontal axis on the upper side represents the values x/d that are indicated by a scale, which are normalized values of the distance x from the nozzle divided by the diameter d at the starting end of the jet flow. This is because the Sauter mean particle size is substantially proportional to the diameter d.

In the case of a jet flow jetted out from one opening as in FIG. 4, the diameter at the starting end of the jet flow jetted out from the nozzle agrees with the diameter of the opening because the opening corresponds to the starting end. In the case of a nozzle of a collision type as in the seeder 3 as stated above, configured to generate a jet flow containing micro-particles that are re-atomized by letting micro-particles sprayed from a plurality of nozzles to collide with each other, the position of such collision of micro-particles corresponds to the starting end of the jet flow. As illustrated in FIG. 1, the position of the collision of micro-particles is present between the position P1 where the center axes 10 of the nozzles 11 cross each other in the travelling direction (the direction of the center axis 4) of the jet flow and the position P2 of the tip ends of the nozzles.

The diameter of the jet flow at the starting end of the jet flow where the micro-particles collide can be measured by an operator who is observing the jet flow to be generated at the position of collision of the micro-particles with a scope. Alternatively, the diameter of the jet flow can be acquired by capturing an image of the position of collision with an imaging device and then analyzing the image with a computer.

As illustrated in FIG. 4, the Sauter mean particle size decreases with an increase in the distance x from the nozzle, and is leveled off at the distance x from the nozzle at about 250 [mm] (x/d=50). That is, atomization does not progress substantially on the downstream side of the jet flow at this position. In this way, the rate of atomization changes with the distance x from the nozzle. Then, when the distance x exceeds a certain value, the atomization does not progress, i.e., stops.

This suggest that, in the seeding device 1 of the present embodiment as well, the progressing rate of atomization of the oil particles in the tubular body 5 changes with an increase in the distance x from the starting end S of the jet flow 2. Then, such a change of the amount of oil particles atomized presumably occurs, having a characteristic as represented with a curve obtained by turning the curve of FIG. 4 upside down. That is, as the distance x increases, such a characteristic increases rapidly in a section of a small distance x, and as the distance x approaches a certain value, the rate of change approaches zero like an asymptote.

That is, the progressing rate of atomization at distance x can be represented with an absolute value a of a first derivative value at the distance x of the graph in FIG. 4, for example. That is, the progressing rate of atomization can be represented as a curve that decreases while approaching zero with the same characteristic as in the graph of FIG. 4.

Then, for the present embodiment as well, the change characteristic of the Sauter mean particle size with reference to the distance x in FIG. 4 is referred to, and the distance X from the starting end S of the jet flow 2 to the tip end T of the tubular body 5 is set to be at least 50 times or more the diameter D at the starting end S of the jet flow 2 ($X/D \geq 50$).

Note here that, when the distance x from the starting end S approaches 50 times the diameter D, the progressing rate of atomization also approaches zero gradually. This means that, even when the distance X to the tip end T of the tubular body 5 is set at a value that is smaller than 50 times the diameter D and is closer to such a value, the effect of promoting atomization can be obtained favorably. Meanwhile, the distance X as small as possible is preferable in terms of the influences on the air flow in the wind tunnel 7 as stated above. Then, the distance X can be set at a value around X/D=50 while setting it as one indication.

Considering such an aspect, a preferable range of the distance X may be $0 \leq \alpha \leq 0.156$ using the first derivative value a of the distance x, for example. When it is represented with x/d of FIG. 4, the range can be $40 \leq x/d$.

Since the progressing rate of atomization approaches zero with a characteristic similar to the curve in FIG. 4 as stated above, it can be said only that $X/D \geq 50$ is preferable from the view point for atomization performed as much as possible with the distance X from the tip end T of the tubular body 5. Then, considering other view points as stated above, such as influences on the air flow in the wind tunnel 7, a preferable value of the distance X can be determined.

Meanwhile, the inner radius R of the tubular body 5 can be determined on the basis of a change characteristic of shear stress with reference to a change in the radial direction position r from the center axis 4 in the jet flow 2. This is because atomization of oil particles is performed based on the shear stress in the jet flow 2. Herein the shear stress includes the Reynolds stress and the viscosity stress, where the Reynolds stress is larger than the viscosity stress by about double digits. That is, the inner radius R of the tubular body 5 can be determined simply by considering the Reynolds stress as the shear stress.

Figure 5:
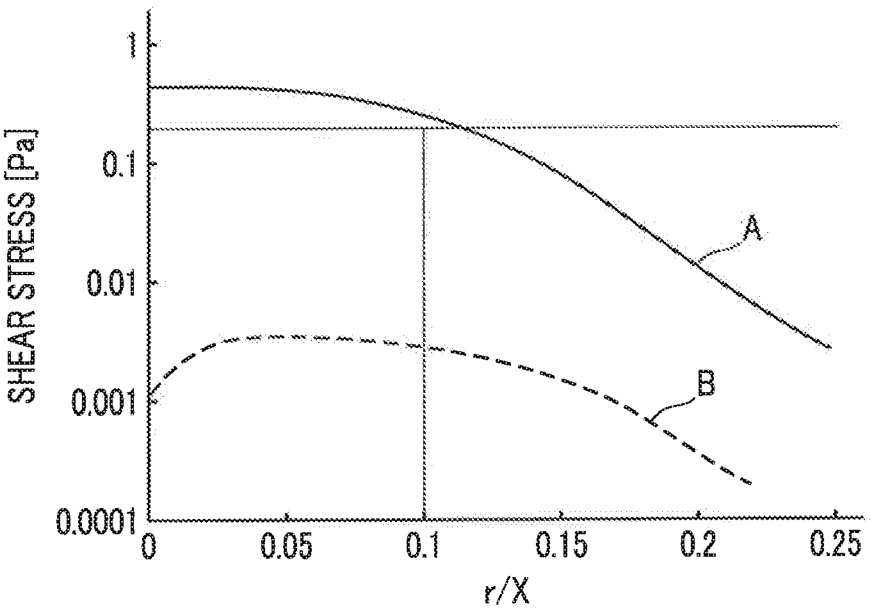
FIG. 5 is a graph representing the transition of shear stress with reference to a change in the position of the jet flow in the radial direction from the starting end to the position away by the distance X that is 50 times the diameter of the jet flow at the starting end, where the horizontal axis represents the value r/X that is a normalized value of the position r in the radial direction divided by the distance X, and the vertical axis represents the shear stress [Pa].

FIG. 5 is a graph representing a change of the shear stress [Pa] with reference to a change of the radial direction position r where there is no tubular body 5 at the tip end position in the case where the distance X from the starting S of the jet flow 2 to the tip end T of the tubular body 5 satisfies X/D=50 as stated above. Since the shear stress in the jet flow 2 is associated with the distance X as well, the radial direction position r is indicated with a value r/X that is a normalized value obtained by dividing it by the distance X. The horizontal axis of the graph represents r/X, and the vertical axis represents the shear stress [Pa].

As stated above, the Reynolds stress and the viscosity stress are associated with the shear stress. In FIG. 5, curve A indicates a change characteristic of the Reynolds stress and curve B indicates a change characteristic of the viscosity stress.

As illustrated in FIG. 5, the shear stress includes the Reynolds stress and the viscosity stress. Herein the Reynolds stress is larger than the viscosity stress by about double digits. Then the Reynolds stress increases with a proximity to the center axis 4 of the jet flow 2. Then the value r satisfying the position r/X=0.1 where the Reynolds stress is half of the maximum value can be used as the inner radius R of the tubular body 5.

This can promote the atomization of oil particles, using the Reynolds stress effectively. Note here that such a value of the inner radius R is just an indication, and a value larger or smaller than this can be used as needed. In that case, the value of r/X is preferably smaller from the view point of influences on the air flow in the wind tunnel 7, or can be the value while considering the influences from the value of r/X on the adherence of oil particles to the tubular body 5.

In this way, the dimensions (length and radius) of the tubular body 5 can be determined so as to yield tracer particles having the particle size range and the number of particles (particle density) that are suitable for an intended wind-tunnel test, while setting X/D=50 and r/X=0.1 as stated above as indications.

Tracer particles that are suitable for a wind-tunnel test can be those including oil particles of a particle size of 1 to 4 [μm] at the number density corresponding to the particles that are obtained when the tubular body 5 is not used, from which oil particles of particle sizes of 4 [μm] or more are substantially removed. During the wind-tunnel test, such oil particles of particle sizes of 1 to 4 [μm] have sufficient scattering intensity for laser light, and hardly adhere to the inside of the wind tunnel.

Specifically, the range of the particle size a that is suitable for a wind-tunnel test can be 1 [μm]≤a≤4 [μm], for example, and such a range of the particle density b can be 3/(32×32) [pieces/pixels]≤b≤6/(32×32)[pieces/pixels].

When tracer particles are supplied into the wind tunnel 7 using the seeding device 1, the seeding device 1 is disposed in the wind tunnel 7, and the oil 14 in the tank 13 is supplied to the seeder 3 by the oil pump 12. Then, compressed air is supplied to the seeder 3 from the air compressor 15. The supplying amount of them can be adjusted suitably using a regulator and a gauge that are provided along a supplying path and are not illustrated.

The oil and the compressed air supplied to the seeder 3 are mixed with the nozzles 11 of the seeder 3, which is then sprayed in the atomization (as micro-particles) state. Oil micro-particles sprayed from the nozzles 11 collide at a position where the center axes of the nozzles 11 cross each other for further atomization and for uniformed distribution of particle size. Then the oil particles and compressed air after collision form a jet flow having the collision position as the starting end S, and is then jetted out from the seeder 3 into the tubular body 5 while expanding to some extent.

In the jet flow 2 jetted out into the tubular body 5, atomization thereof is promoted at a part having large Reynolds stress as stated above. As stated above, the part for promotion of atomization assumes a tapered shape like a cone, and disappears before it reaches the position of the tip end T of the tubular body 5.

During this process, among oil particles located on the side of outer circumference of the jet flow 2 where atomization is not performed, those having a relatively large particle size, e.g., 4 [μm] or more, collide with the inner wall of the tubular body 5 for adherence.

This can remove oil particles of a large particle size, for which atomization is not promoted at a peripheral part in the wind tunnel 7, and can promote atomization sufficiently in the vicinity of the center axis 4. Then, tracer particles supplied from the tip end T of the tubular body 5 into the wind tunnel 7 can have an adjusted average value of the particle size that is a predetermined value or less and can have adjusted number density that is a predetermined value or more.

Specifically tracer particles have the particle size of 1 to 4 [μm], and have the number density that is equal to the number density of particles having such a size that is included in the jet flow 2 when the jet flow is jetted out from the seeder 3 without the tubular body 5.

The oil particles adhered to the inner wall of the tubular body 5 are collected to be an oil flow, and flows down to the bottom part of the nozzle base 9, which is then collected at the tank 13 via the collection channel 16 at the bottom part of the nozzle base 9.

As stated above, the present embodiment is provided with the tubular body 5 that surrounds the jet flow 2 jetted out from the seeder 3 along the jetting direction, which can prevent particles of a large particle size, e.g., exceeding 4 [μm], from being included in the tracer particles to be supplied to the wind tunnel 7 as much as possible.

The tubular body 5 discharges a part of the jet flow 2 in a predetermined range from the center axis 4, e.g., a part in the range having the above-stated value of r/X smaller than 0.1, into the wind tunnel 7 as it is, and so atomization of oil particles that can progress favorably in the range closer to the center axis 4 cannot be disturbed. This can increase the number of tracer particles of a small particle size, e.g., 1 to 4 [μm].

Since the distance X from the starting end S of the jet flow 2 to the tip end T of the tubular body 5 is 50 times or more the diameter D at the starting end S of the jet flow 2, oil particles in the state where atomization thereof has been completed sufficiently can be supplied into the wind tunnel 7 as tracer particles. This can increase the number of the tracer particles more effectively.

The dimensions of the tubular body 5 in the radial direction RD orthogonal to the center axis 4 of the jet flow 2 are determined based on a change characteristic of the shear force with reference to a change of the position in the radial direction RD in the jet flow 2. This can make use of the shear stress that contributes to atomization of oil particles in the jet flow 2, and so can promote the atomization sufficiently.

Figure 6:
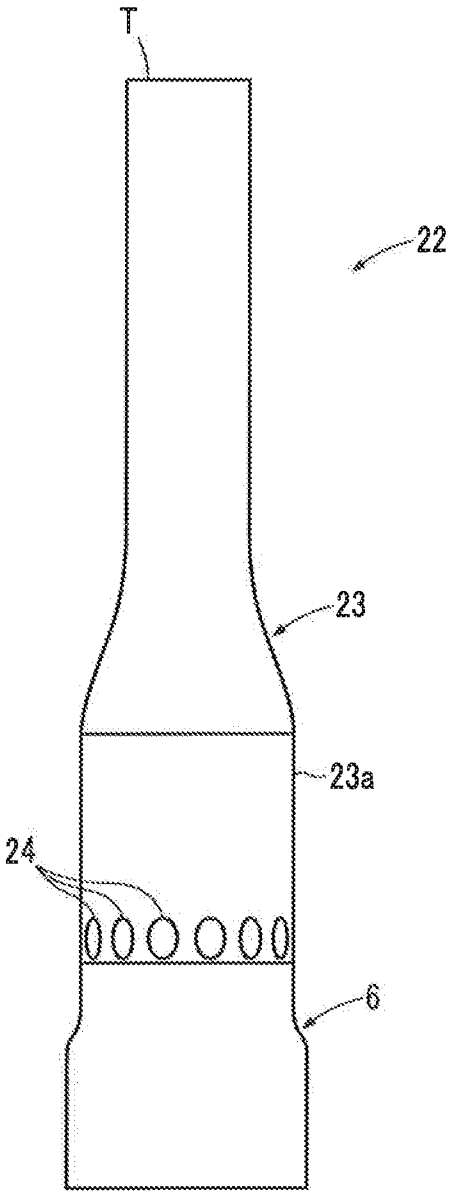
FIG. 6 is a front view of a seeding device according to another embodiment of the present invention.

FIG. 6 is a front view of a seeding device according to another embodiment of the present invention. This seeding device 22 includes, instead of the tubular body 5 in the seeding device 1 of FIG. 1, a tubular body 23 including: a base end part with an expanding diameter of the tubular body 5 and additionally including an enlarged-diameter part **23*a*** having the diameter equal to that of the base-end part.

The tubular body 23 is connected to the oil receiver 6 via the enlarged-diameter part **23*a*. The seeding device 22 has a configuration similar to that of the seeding device 1 of FIG. 1 in other respects. This tubular body 23 has a length that is equal to that of the seeding device 1 in FIG. 1**.

The enlarged-diameter part **23*a* on the base-end side is provided with six circular openings 24 at regular intervals in the range that is slightly shorter than half of the circumference. The openings 24 are located in the longitudinal direction of the tubular body 23 at the starting end S of the jet flow 2 from the seeder 3 (see FIG. 1**) or a position slightly closer to the tip end T from that.

When the seeding device 22 is disposed in the wind tunnel 7, the tubular body 23 is disposed to be directed vertically above so that the side for the arrangement of the openings 24 is directed toward the windward in the wind tunnel 7. This allows the air around the enlarged-diameter part **23*a* to be introduced through the openings 24, and so can further promote the atomization of oil particles in the jet flow 2 from the seeder 3. The openings 24 may not be directed to the windward because the root part of the jet flow 2** itself has a property of drawing in the flow, and in this case also, the surrounding air can be drawn in.

That is, a large ring vortex is typically generated in the jet flow from a nozzle at a position immediately after the jetting-out from a nozzle. Such a ring vortex is deformed like a wave in the circumferential direction as it travels, and is divided into smaller vortices in size. Then such vortices disappear when the jet flow travels to the position where the above-stated potential core disappears (the terminal end of the potential region). This can promote the miniaturization of liquid particles included in the jet flow.

According to the present embodiment, division and disappearance of such a ring vortex in the jet flow 2 from the seeder 3 can be promoted without problems by the air introduced through the openings 24. This can reduce oil particles of a large particle size in number that adhere to the inner wall of the tubular body 23, and accordingly increase oil particles that are suitable for tracer in number.

That is, more tracer particles can be supplied into the wind tunnel 7. Specifically tracer particles in number that is 1.5 times the case without the openings 24 can be supplied, for example. The amount of particles supplied can be adjusted based on the degree of opening of the openings 24.

The present invention is not limited to the above embodiments. For instance, the tubular body 5 may have a shape other than a cylindrical shape as long as oil particles of a large particle size can adhere thereto. For instance, it may have a polygonal shape or a circular truncated cone shape. Liquid particles making up the tracer particles may be other type of liquid, such as particles of water, for example, instead of the oil particles as stated above.

What is claimed is:

1. A seeding device including a seeder, from which a jet flow containing liquid particles and gas is jetted out, the seeding device being configured to discharge tracer particles made up of the liquid particles, comprising:

a tubular body that surrounds the jet flow along a center axis of the tubular body in a jetting direction of the jet flow so as to allow a part of the liquid particles in the jet flow to adhere to an inner wall of the tubular body, wherein the seeder comprises two nozzles with each nozzle having a respective center axis that cross each other, each of the two nozzles is configured to spray liquid while atomizing the liquid with compressed air, the tubular body is configured to discharge liquid particles in the jet flow that have progressed in atomization inside of the tubular body from a tip end thereof as tracer particles, by deriving the jet flow from the tip end thereof while maintaining the center axis of the flow at a center portion of the jet flow in a constant direction, a distance from a starting end of the jet flow where the liquid particles are jetted out by each of the two nozzles, to the tip end of the tubular body in the jetting direction of the jet flow, is set so a value that is obtained by dividing the distance by a diameter of the jet flow is 50 or more, the diameter of the jet flow being located at the starting end of the jet flow where the liquid particles jetted out by each of the two nozzles collide, the inner wall of the tubular body comprises an annular protrusion that protrudes inwardly and annually, and is provided at an exit of the tubular body, the two nozzles are disposed apart from the inner wall in the inner side to jet out the jet flow, the seeder jets out the jet flow containing liquid particles and air while setting a the starting end at a vicinity of collision of liquid particles from the two nozzles, and the inner wall of the tubular body is free from partitions orthogonal to a flowing direction of the jet flow in an area between the annular protrusion and the two nozzles.

2. The seeding device according to claim 1, wherein the tubular body has a dimension in a direction orthogonal to a center axis of the jet flow that is determined based on a change characteristic of shear stress with reference to a change in position in the direction in the jet flow so that tracer particles in a desired range of particle sizes and particle density can be obtained.

3. The seeding device according to claim 1, further comprising an opening at a position at the tubular body in a predetermined range from the seeder, the opening being configured to introduce outside air into the tubular body.

4. The seeding device according to claim 3, wherein the opening is located in a longitudinal direction from a central flow axis of the tubular body at a position of the starting end of the jet flow or at a position closer to the tip end of the tubular body than the position of the starting end.

5. A seeding method comprising;

disposing the seeding device according to claim 1 in a wind tunnel, and then jetting out a jet flow containing liquid particles and gas from the seeder of the seeding device, thus supplying tracer particles into the wind tunnel.

6. The seeding device according to claim 1, wherein a surface of the annular protrusion at a starting end side of the jet flow is formed as an inclined surface that inclines to the tip end direction of the tubular body as becoming farther from the inner wall of the tubular body.

7. The seeding device according to claim 1, wherein a distance between the annular protrusion and the nozzle is longer than a distance between the annular protrusion and the exit of the tubular body.

* * * * *